(12) United States Patent
Yu et al.

(10) Patent No.: US 12,154,591 B2
(45) Date of Patent: Nov. 26, 2024

(54) VOICE INTERACTIVE WAKEUP ELECTRONIC DEVICE AND METHOD BASED ON MICROPHONE SIGNAL, AND MEDIUM

(71) Applicant: TSINGHUA UNIVERSITY, Beijing (CN)

(72) Inventors: Chun Yu, Beijing (CN); Yuanchun Shi, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 412 days.

(21) Appl. No.: 17/616,091

(22) PCT Filed: May 26, 2020

(86) PCT No.: PCT/CN2020/092283
§ 371 (c)(1),
(2) Date: Dec. 2, 2021

(87) PCT Pub. No.: WO2020/244416
PCT Pub. Date: Dec. 10, 2020

(65) Prior Publication Data
US 2022/0319538 A1   Oct. 6, 2022

(30) Foreign Application Priority Data

Jun. 3, 2019 (CN) .......................... 201910475978.6

(51) Int. Cl.
*G10L 25/78* (2013.01)
*G10L 15/02* (2006.01)
(Continued)

(52) U.S. Cl.
CPC .............. *G10L 25/78* (2013.01); *G10L 15/02* (2013.01); *G10L 15/26* (2013.01); *G10L 25/30* (2013.01);
(Continued)

(58) Field of Classification Search
CPC ......... G10L 25/78; G10L 15/02; G10L 15/26; G10L 25/30; G10L 2015/025; G10L 2025/783
(Continued)

(56) References Cited

U.S. PATENT DOCUMENTS 7,502,484 B2 * 3/2009 Ngia ....................... G10L 15/02
381/320
9,443,537 B2 * 9/2016 Shioda .................. G10L 21/057
(Continued)

FOREIGN PATENT DOCUMENTS

CN          1773604 A        5/2006
CN        107889031 A        4/2018
(Continued)

OTHER PUBLICATIONS

C. Zhang et al., "Analysis and Classification of Speech Mode: Whispered through Shouted", Interspeech: 2289-2292 (2007).
(Continued)

*Primary Examiner* — Michael N Opsasnick
(74) *Attorney, Agent, or Firm* — Merchant & Gould P.C.

(57) ABSTRACT

An electronic device configured with a microphone, a voice interaction wake-up method executed by an electronic device equipped with a microphone, and a computer-readable medium, the electronic device comprising a memory and a central processing unit, wherein the memory stores computer-executable instructions, and when executed by the central processing unit, the computer-executable instructions perform the following operations: analyzing a sound signal collected by a microphone, identifying whether the sound signal contains speech spoken by a person and whether it contains wind noise sounds generated by airflows hitting the microphone as a result of the speech spoken by the person, and in response to determining that the sound
(Continued)

S101
Analyze a sound signal collected by the microphone, and determine whether the sound signal contains a voice of a user speaking and a wind noise generated by an airflow hitting the microphone caused by the user speaking S102
In a case that the sound signal contains the voice of the user speaking and the wind noise generated by the airflow hitting the microphone caused by the user speaking, perform processing on the sound signal as a voice input from the user signal contains sound spoken by the person and contains wind noise sounds generated by airflows hitting the microphone as a result of the speech spoken by the user, processing the sound signal as speech input by the user. The solution disclosed in the present application is applicable to performing voice input when a user carries an intelligent electronic device, and the operation is natural and simple, simplifying the steps of voice input, reducing the burden and difficulty of interaction, and making the interaction more natural.

13 Claims, 6 Drawing Sheets

(51) Int. Cl.
*G10L 15/26* (2006.01)
*G10L 25/30* (2013.01)

(52) U.S. Cl.
CPC .. *G10L 2015/025* (2013.01); *G10L 2025/783* (2013.01)

(58) Field of Classification Search
USPC ............................................ 704/200
See application file for complete search history.

(56) References Cited

U.S. PATENT DOCUMENTS

| | | | | |
|---|---|---|---|---|
| 9,800,983 | B2* | 10/2017 | Wacquant | H04R 27/00 |
| 10,237,648 | B2* | 3/2019 | Takada | B60R 11/02 |
| 11,152,015 | B2* | 10/2021 | Sung | G10K 11/17827 |
| 11,227,626 | B1* | 1/2022 | Krishnan Gorumkonda | G06F 3/167 |
| 11,315,586 | B2* | 4/2022 | Huang | G10L 25/30 |
| 2004/0176949 | A1 | 9/2004 | Wenndt et al. | |
| 2011/0282673 | A1 | 11/2011 | Di Profio et al. | |
| 2017/0358301 | A1 | 12/2017 | Raitio et al. | |
| 2021/0142796 | A1 | 5/2021 | Saito | |

FOREIGN PATENT DOCUMENTS

| | | |
|---|---|---|
| CN | 109074805 A | 12/2018 |
| CN | 109313898 A | 2/2019 |
| CN | 109448759 A | 3/2019 |
| CN | 109558788 A | 4/2019 |
| CN | 110223711 A | 9/2019 |
| JP | 2011-209787 A | 10/2011 |
| WO | 2018/223388 A1 | 12/2018 |

OTHER PUBLICATIONS

G. N. Meenakshi et al., "Robust Whisper Activity Detection Using Long-Term Log Energy Variation of Sub-Band Signal", IEEE Signal Processing Letters 22(11): 1859-1863 (2015).
International Search Report PCT/CN2020/092283 (Sep. 3, 2020).
Li et al., "Whisper-to-speech conversion using restricted Boltzmann machine arrays", Electronic Letters, 2014, 50(24): 1781-1782. ISSN 0013-5194.
Ghaffarzadegan et al., "Generative Modeling of Pseudo-Whisper for Robust Whispered Speech Recognition", IEEE/ACM Transactions on Audio, Speech, and Language Processing, 2016, 24(10): 1705-1720.

* cited by examiner

VOICE INTERACTIVE WAKEUP ELECTRONIC DEVICE AND METHOD BASED ON MICROPHONE SIGNAL, AND MEDIUM

The present application is the national phase of International Patent Application No. PCT/2020/092283, titled "VOICEE INTERACTIVE WAKEUP ELECTRONIC DEVICE AND METHOD BASED ON MICROPHONE SIGNAL, AND MEDIUM", filed on May 26, 2020, which claims priority to Chinese Patent Application No. 201910475978.6, titled "VOICE INTERACTIVE WAKEUP ELECTRONIC DEVICE AND METHOD BASED ON MICROPHONE SIGNAL, AND MEDIUM", filed on Jun. 3, 2019 with the Chinese Patent Office, both of which are incorporated herein by reference in their entireties.

FIELD

The present disclosure relates to the field of voice input, and in particular to an intelligent electronic device and a method for triggering voice input.

BACKGROUND

With the development of computer technology, voice recognition algorithms gradually mature, and voice input is becoming important in interaction due to high naturalness and effectiveness. The user may interact with a mobile device (such as a mobile phone and a watch) by inputting voice to perform various tasks such as command input, information query, and voice chat.

However, as for when to trigger the voice input, the solutions according to the conventional technology have disadvantages.

1. Triggering by a Physical Button

Voice input is activated by pressing (or pressing and holding) one (or some) physical button of the mobile device. This solution has the following disadvantages. A physical button is required. It is easy to perform triggering by mistake. It is required for the user to press the physical button.

2. Triggering by an Interface Element

Voice input is activated by clicking (or clicking and holding) an interface element (such as an icon) on a screen of the mobile device. This solution has the following disadvantages. It is required for the device to have a screen. The trigger element occupies the screen. Due to the limitation of the software UI, the triggering process may be cumbersome. It is easy to perform triggering by mistake.

3. Triggering by Detecting a Wakeup Word (Voice)

Voice input is activated by detecting a wakeup word, where the wakeup word is a specific word (such as a nickname of a product). This solution has the following disadvantages. The privacy and sociality are poor. The interaction efficiency is low.

SUMMARY

In view of the above issues, the present disclosure is provided.

According to an aspect of the present disclosure, an electronic device arranged with a microphone is provided. The electronic device includes a memory and a central processor. The memory stores computer executable instructions. The computer executable instructions, when executed by the central processor, cause the central processor to: analyze a sound signal collected by the microphone, determine whether the sound signal contains a voice of a user speaking and a wind noise generated by an airflow hitting the microphone caused by the user speaking; and in a case that the sound signal contains the voice of the user speaking and the wind noise generated by the airflow hitting the microphone caused by the user speaking, perform processing on the sound signal as a voice input from the user.

In an embodiment, the voice of the user speaking includes: a voice of the user speaking at a normal volume, a voice of the user speaking at a low volume, and a voice of the user speaking without vibration of vocal cords.

In an embodiment, the central processor is further configured to: in a case that the user is speaking to the electronic device closely, determine the voice of the user speaking is a voice of the user speaking at a normal volume, a voice of the user speaking at a low volume, or a voice of the user speaking without vibration of vocal cords; and perform processing on the sound signal based on a determination result.

In an embodiment, the processing is performed by activating different applications to perform processing on the voice input.

In an embodiment, features for determination include a volume, a spectral feature, an energy distribution, and the like.

In an embodiment, the processing performed on the sound signal as a voice input from the user includes one or more of the following processing: storing the sound signal in a storage medium of the electronic device; transmitting the sound signal via an internet; converting a voice signal in the sound signal to a text, and storing the text in the storage medium of the electronic device; converting the voice signal in the sound signal to the text, and transmitting the text via the internet; and converting the voice signal in the sound signal to the text, determining the voice signal as a voice command from the user, and performing processing in response to the voice command.

In an embodiment, the central processor is further configured to: identify a specific user based on voiceprint analysis, and perform processing on a sound signal containing a voice of the specific user.

In an embodiment, the electronic device is one of an intelligent phone, an intelligent watch, and an intelligent ring.

In an embodiment, the central processor is further configured to: determine, by using a neural network model, whether the sound signal contains the voice of the user speaking and the wind noise generated by the airflow hitting the microphone caused by the user speaking.

In an embodiment, the electronic device may be configured to: determine whether the sound signal contains the voice of the user speaking and the wind noise generated by the airflow hitting the microphone caused by the user speaking; in a case that the sound signal contains the voice of the user, recognize phonemes in the voice and convert a voice signal to a phoneme sequence; determine, for each of phonemes in the phoneme sequence, whether the phoneme is an exhale phoneme, where an airflow comes out of a mouth of the user when the user utters the phoneme; divide the sound signal into exhale phoneme segments using a window having a constant length, where the sound segments form a sound segment sequence; determine, for each of the sound segments, whether the sound segment contains the wind noise based on a frequency feature; and compare exhale phonemes in the phoneme sequence with sound segments determined as the wind noise in the sound segment sequence, compare non-exhale phonemes in the phoneme sequence with wind noise segments, and determine that the sound signal contains the wind noise generated by the airflow hitting the microphone caused by the user speaking in a case that an overlap degree of the exhale phonemes and the wind noise segments is higher than a threshold and an overlap degree of the non-exhale phonemes and non-wind noise segments is lower than a threshold.

In an embodiment, whether the sound signal contains the voice of the user speaking and the wind noise generated by the airflow hitting the microphone caused by the user speaking is determined by: determining whether the sound signal contains a sound feature of the wind noise; in a case that the sound signal contains the wind noise, determining whether the sound signal contains a voice signal; in a case that the sound signal contains the voice signal, recognizing a phoneme sequence corresponding to the voice signal; calculating, for a wind noise feature in the sound signal, an intensity of the wind noise feature at each of time instants; obtaining, for each of phonemes in the phoneme sequence, a exhalation strength of the phoneme based on a pre-defined data model; and analyzing a consistency of the wind noise feature and the phoneme sequence based on a Gaussian mixture Bayesian model, and determining that the sound signal contains the wind noise generated by the airflow hitting the microphone caused by the user speaking in a case that an overlap degree is higher than a threshold.

According to another aspect of the present disclosure, a method for awakening voice interaction, performed by an electronic device arranged with a microphone, is provided. The electronic device includes a memory and a central processor. The memory stores computer executable instructions. The computer executable instructions, when executed by the central processor, cause the central processor to perform the method for awakening voice interaction. The method for awakening voice interaction includes: analyzing a sound signal collected by the microphone, and determining whether the sound signal contains a voice of a user speaking and a wind noise generated by an airflow hitting the microphone caused by the user speaking; and in a case that the sound signal contains the voice of the user speaking and the wind noise generated by the airflow hitting the microphone caused by the user speaking, performing processing on the sound signal as the voice input from the user.

According to another aspect of the present disclosure, a computer readable medium is provided. The computer readable medium stores computer executable instructions. The computer executable instructions, when executed by a computer, cause the computer to perform a method for awakening voice interaction. The method for awakening voice interaction includes: analyzing a sound signal collected by the microphone, and determining whether the sound signal contains a voice of a user speaking and a wind noise generated by an airflow hitting the microphone caused by the user speaking; and in a case that the sound signal contains the voice of the user speaking and the wind noise generated by the airflow hitting the microphone caused by the user speaking, performing processing on the sound signal as the voice input from the user.

According to another aspect of the present disclosure, an electronic device arranged with multiple microphones is provided. The electronic device includes a memory and a central processor. The memory stores computer executable instructions. The computer executable instructions, when executed by the central processor, cause the central processor to: analyze sound signals collected by the multiple microphones; determine whether the user is speaking to the electronic device closely; and in a case that the user is speaking to the electronic device closely, perform processing on the sound signals collected by the microphones as voice inputs from the user.

In an embodiment, the multiple microphones form a microphone array system.

In an embodiment, whether the user is speaking to the electronic device closely is determined by: calculating a position of a mouth of the user relative to a microphone array based on differences of time instants when sound signals arrives at microphones in the microphone array; and determining that the user is speaking to the electronic device closely in a case that a distance between the mouth of the user and the electronic device is less than a threshold.

In an embodiment, the distance threshold is 10 cm.

In an embodiment, the processing performed on the sound signals as voice inputs from the user includes: processing performed based on the distance between the mouth of the user and the electronic device in response to the voice inputs from the user.

In an embodiment, whether the user is speaking to the electronic device closely is determined by: determining whether a sound signal collected by at least one microphone contains a voice signal of the user speaking; in a case that the sound signal collected by the at least one microphone contains the voice signal of the user speaking, extracting the voice signal from the sound signal collected by the microphone; determining whether differences of amplitudes of voice signals extracted from the sound signals collected by the microphones exceed a predetermined threshold; and in a case that the differences of amplitudes exceed the predetermined threshold, determining that the user is speaking to the electronic device closely.

In an embodiment, the electronic device may be further configured to: determine a microphone, by which a voice signal collected has a largest amplitude, in the multiple microphones as a response microphone; and perform processing based on the determined response microphone in response to the voice inputs from the user.

In an embodiment, whether the user is speaking to the electronic device closely is determined by: based on a pre-trained machine learning model, processing the sound signals collected by the multiple microphones, and determining whether the user is speaking to the electronic device closely.

In an embodiment, a voice of the user speaking includes: a voice of the user speaking at a normal volume, a voice of the user speaking at a low volume, and a voice of the user speaking without vibration of vocal cords.

In an embodiment, a voice of the user speaking includes: a voice of the user speaking at a normal volume, a voice of the user speaking at a low volume, and a voice of the user speaking without vibration of vocal cords.

In an embodiment, the central processor may be further configured to: in a case that the user is speaking to the electronic device closely, determine the voice of the user speaking is a voice of the user speaking at a normal volume, a voice of the user speaking at a low volume, or a voice of the user speaking without vibration of vocal cords; and perform processing on the sound signals based on a determination result.

In an embodiment, the processing is performed by activating different applications to perform processing on the voice input.

In an embodiment, features for determination include a volume, a spectral feature, and an energy distribution.

In an embodiment, the processing performed on the sound signals as voice inputs from the user includes one or more of the following processing: storing the sound signals in a storage medium of the electronic device; transmitting the sound signals via an interne; converting voice signals in the sound signals to texts, and storing the texts in the storage medium of the electronic device; converting the voice signals in the sound signals to the texts, and transmitting the texts via the internet; and converting the voice signals in the sound signals to the texts, determining the voice signal as a voice command from the user, and performing processing in response to the voice command.

In an embodiment, the electronic device may be further configured to: identify a specific user based on voiceprint analysis, and perform processing on a sound signal containing a voice of the specific user.

In an embodiment, the electronic device is one of an intelligent phone, an intelligent watch, an intelligent ring, and a tablet computer.

According to another aspect of the present disclosure, an electronic device arranged with a microphone is provided. The electronic device includes a memory and a central processor. The memory stores computer executable instructions. The computer executable instructions, when executed by the central processor, cause the central processor to: determine whether a sound signal collected by the microphone contains a voice signal; in a case that the sound signal collected by the microphone contains the voice signal, determine whether the user is speaking at a low volume, that is, speaking at a volume lower than a normal volume; in a case that the user is speaking at the low volume, perform processing on the sound signal as a voice input without performing any awakening operation.

In an embodiment, the speaking at a low volume includes speaking at a low volume with vibration of vocal cords and speaking at a low volume without vibration of vocal cords.

In an embodiment, the electronic device is further configured to: in a case that the user is speaking at the low volume, determine whether the user is speaking at the low volume with vibration of vocal cords or at the low volume without vibration of vocal cords; and perform processing on the sound signal based on a determination result.

In an embodiment, the processing is performed by activating different applications in response to the voice input.

In an embodiment, signal features based on which whether the user is speaking in the low volume is determined include a volume, a spectral feature, and an energy distribution.

In an embodiment, signal features based on which whether the user is speaking at the low volume with vibration of vocal cords or at the low volume without vibration of vocal cords is determined include the volume, the spectral feature, and the energy distribution.

In an embodiment, whether the user is speaking at the low volume is determined by: based on a machine learning model, performing processing on the sound signal collected by the microphone and determining whether the user is speaking at the low volume.

In an embodiment, the machine learning model is a convolutional neural network model or a recurrent neural network model.

In an embodiment, whether the user is speaking at the low volume with vibration of vocal cords or at the low volume without vibration of vocal cords is determined by: based on a machine learning model, performing processing on the sound signal collected by the microphone, and determining whether the user is speaking at the low volume with vibration of vocal cords or at the low volume without vibration of vocal cords.

In an embodiment, the machine learning model is a convolutional neural network model or a recurrent neural network model.

In an embodiment, the processing performed on the sound signal as a voice input from the user includes one or more of the following processing: storing the sound signal in a storage medium of the electronic device; transmitting the sound signal via an internet; converting a voice signal in the sound signal to a text, and storing the text in the storage medium of the electronic device; converting the voice signal in the sound signal to the text, and transmitting the text via the internet; and converting the voice signal in the sound signal to the text, determining the voice signal as a voice command from the user, and performing processing in response to the voice command.

In an embodiment, a specific user is identified based on voiceprint analysis, and processing is only performed on a sound signal containing a voice of the specific user.

In an embodiment, the electronic device is an intelligent phone, an intelligent watch, an intelligent ring, and the like.

According to one aspect of the present disclosure, an intelligent electronic device with a built-in microphone is provided. The intelligent electronic portable device is configured to interact with a user based on a voice input by: performing processing on a sound signal collected by the microphone, and determining whether the sound signal includes a voice signal; in a case that the sound signal includes the voice signal, determining whether a distance between the intelligent electronic device and a mouth of the user is less than a predetermined threshold based on the sound signal collected by the microphone; and in a case that the distance between the intelligent electronic device and the mouth of the user is less than the predetermined threshold, performing processing on the sound signal collected by the microphone as a voice input.

In an embodiment, the predetermined threshold is 3 cm.

In an embodiment, the predetermined threshold is 1 cm.

In an embodiment, the electronic device is further arranged with a proximity light sensor at a position of the microphone, and the electronic device is configured to determine whether an object is approaching the electronic device by using the proximity light sensor.

In an embodiment, the electronic device is further arranged with a distance sensor at the position of the microphone, and the electronic device is configured to measure the distance between the electronic device and the mouth of the user by using the distance sensor.

In an embodiment, whether the distance between the intelligent electronic device and the mouth of the user is less than the predetermined threshold is determined based on a feature of the sound signal collected by the microphone.

In an embodiment, the voice signal includes one or a combination of: a voice of the user speaking at a normal volume, a voice of the user speaking at a low volume, and a voice of the user speaking without vibration of vocal cords.

In an embodiment, the electronic device is further configured to: in a case that the user is speaking to the electronic device closely, determine the user is speaking with one of a voice of the user speaking at a normal volume, a voice of the user speaking at a low volume, and a voice of the user speaking without vibration of vocal cords; and perform processing on the sound signal based on a determination result.

In an embodiment, the processing is performed by activating different applications to perform processing on the voice input.

In an embodiment, features for determination include a volume, a spectral feature, an energy distribution, and the like.

In an embodiment, features based on which whether the distance between the intelligent electronic device and the mouth of the user is less than the predetermined threshold is determined include a time-domain feature, a frequency-domain feature, the volume, and a spectral energy.

In an embodiment, whether the distance between the intelligent electronic device and the mouth of the user is less than the predetermined threshold is determined by: obtaining, by a filter, the voice signal from the sound signal collected by the microphone; determining whether an energy of the voice signal exceeds a threshold; and in a case that the energy of the voice signal exceeds the threshold, determining the distance between the intelligent electronic device and the mouth of the user is less than the predetermined threshold.

In an embodiment, whether the distance between the intelligent electronic device and the mouth of the user is less than the predetermined threshold is determined by: performing processing one data collected by the microphone by using a deep neural network model, and determining whether the distance between the intelligent electronic device and the mouth of the user is less than the predetermined threshold.

In an embodiment, whether the distance between the intelligent electronic device and the mouth of the user is less than the predetermined threshold is determined by: recording a voice signal from the user in a case that the user does not make a voice input; comparing a current voice signal collected by the microphone with the voice signal in the case that the user does not make the voice input; and in a case that a volume of the current voice signal collected by the microphone exceeds a volume of the voice signal in the case that the user does not make the voice input by a threshold, determining that the distance between the intelligent electronic device and the mouth of the user is less than the predetermined threshold.

In an embodiment, the processing performed on the sound signal as a voice input from the user includes one or more of the following processing: storing the sound signal in a storage medium of the electronic device; transmitting the sound signal via an internet; converting a voice signal in the sound signal to a text, and storing the text in the storage medium of the electronic device; converting the voice signal in the sound signal to the text, and transmitting the text via the internet; and converting the voice signal in the sound signal to the text, determining the voice signal as a voice command from the user, and performing processing in response to the voice command.

In an embodiment, the electronic device is configured to identify a specific user based on voiceprint analysis, and perform processing on a sound signal containing a voice of the specific user.

In an embodiment, the electronic device is an intelligent phone, an intelligent watch, an intelligent ring, and the like.

A mobile device according to the present disclosure includes, but is not limited to, a mobile phone, a head-mounted display, a watch, and a smaller intelligent wearable device such as an intelligent rings and an intelligent watch.

At least the following advantages are achieved according to the present disclosure.

1. Natural interaction. Voice input is triggered by putting the device in front of the mouth, conforming to the habits and cognition of the user.
2. High efficiency. Operation can be performed with one hand. It is unnecessary to switch between different user interfaces/applications or press a button, and it is only required to lift a hand to put the device next to the mouth.
3. High radio quality. Since a recorder of the device is next to the mouth of the user, the voice input signal received is clear, less affecting by environmental sounds.
4. High privacy and sociality. A high-quality voice input is provided by the user speaking at a low volume due to that the device is in front of the mouth, causing little interference to others. In addition, the user may make actions such as covering the mouth, achieving a good privacy protection.

BRIEF DESCRIPTION OF THE DRAWINGS

In order to more clearly illustrate the technical solutions according to the embodiments of the present disclosure or the conventional technology, the drawings to be used in the description of the embodiments or the conventional technology are briefly described hereinafter. Apparently, the drawings described below illustrate only some embodiments of the present disclosure. Other drawings may be obtained by those skilled in the art according to these drawings without any creative effort.

DETAILED DESCRIPTION OF EMBODIMENTS

In order that those skilled in the art may better understand the present disclosure, the present disclosure is described in detail hereinafter in conjunction with the drawings and with reference to the embodiments.

In the present disclosure, for triggering voice input of an intelligent electronic device, whether to trigger a voice input application is determined based on a feature of a sound collected by a microphone arranged in the electronic device. With the present disclosure, it is unnecessary to perform triggering by a physical button, triggering by an interface element and triggering by detecting a wakeup word according to the conventional technology, realizing natural interaction. According to the present disclosure, voice input is triggered by putting the device in front of the mouth, conforming to the habits and cognition of the user.

The present disclosure is described in the following aspects. 1. Triggering voice input based on a feature of a wind noise when the user speaking. Specifically, voice input is triggered by recognizing a voice and a wind noise when the user speaking, and processing is performed on a received sound signal as a voice input. 2. Triggering voice input based on differences of sound signals received by multiple microphones. 3. Triggering voice input based on recognition of a speaking at a low volume. 4. Triggering voice input based on determination of a distance of a sound signal received by a microphone.

1. Triggering Voice Input Based on a Feature of a Wind Noise When the User Speaking In a case that the user speaks to a microphone closely at a low volume or without vibration of vocal cords, the sound signal collected by the microphone contains two sound components. One sound component is a sound generated by the vibration of the vocal cords and the oral cavity of the user, and the other sound component is a wind noise generated by an airflow hitting the microphone caused by the user speaking. The voice input application of the electronic device may be triggered based on the above features.

Figure 1:
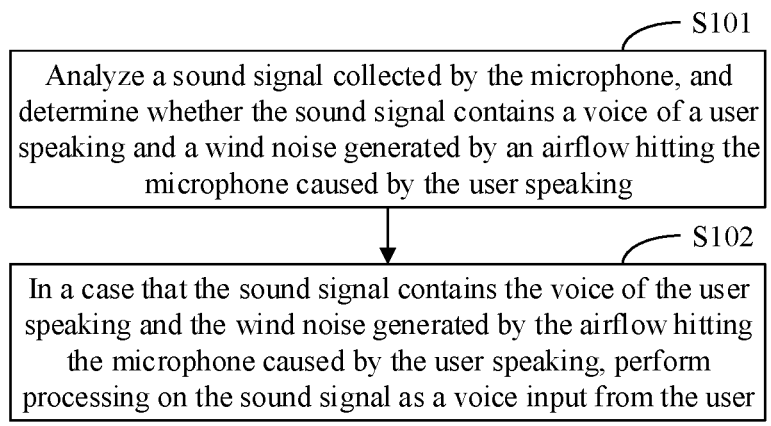
FIG. 1 shows a flow chart of a voice input interaction method according to an embodiment of the present disclosure.

FIG. 1 shows a flow chart of a voice input interaction method 100 according to an embodiment of the present disclosure.

In step S101, a sound signal collected by the microphone is analyzed, and it is determined whether the sound signal contains a voice of a user speaking and a wind noise generated by an airflow hitting the microphone caused by the user speaking.

In step S102, in a case that the sound signal contains the voice of the user speaking and the wind noise generated by the airflow hitting the microphone caused by the user speaking, processing is performed on the sound signal as a voice input from the user.

The voice input interaction method according to the embodiment of the present disclosure is applicable to a situation having a high privacy requirement in which voice input is performed without vibration of vocal cords.

The voice of the user speaking includes: a voice of the user speaking at a normal volume, a voice of the user speaking at a low volume, and a voice of the user speaking without vibration of vocal cords.

In an embodiment, the voice of the user speaking may be determined, and different feedbacks are generated based on a determination result. For example, a voice assistant of a mobile phone is controlled in a case that the user is speaking at a normal volume, WeChat is controlled in a case that the user is speaking at a low volume, and voice transcription notes is made in a case that the user is speaking without vibration of vocal cords.

In an embodiment, the processing performed on the sound signal as a voice input from the user includes one or more of the following processing: storing the sound signal in a storage medium of the electronic device; transmitting the sound signal via an internet; converting a voice signal in the sound signal to a text, and storing the text in the storage medium of the electronic device; converting the voice signal in the sound signal to the text, and transmitting the text via the internet; and converting the voice signal in the sound signal to the text, determining the voice signal as a voice command from the user, and performing processing in response to the voice command.

In an embodiment, a specific user is identified based on voiceprint analysis, and processing is only performed on a sound signal containing a voice of the specific user.

In an embodiment, the electronic device is one of an intelligent phone, an intelligent watch, and an intelligent ring.

In an embodiment, whether the sound signal contains the voice of the user speaking and the wind noise generated by the airflow hitting the microphone caused by the user speaking is determined by using a neural network model. This is only an embodiment, and other machine learning algorithms may be used.

In an embodiment, whether the sound signal contains the voice of the user speaking and the wind noise generated by the airflow hitting the microphone caused by the user speaking is determined by: determining whether the sound signal contains the voice of the user; in a case that the sound signal contains the voice of the user, recognizing phonemes in the voice and converting a voice signal to a phoneme sequence; determining, for each of phonemes in the phoneme sequence, whether the phoneme is an exhale phoneme, where an airflow comes out of a mouth of the user when the user utters the phoneme; dividing the sound signal into exhale phoneme segments using a window having a constant length, where the sound segments form a sound segment sequence; determining, for each of the sound segments, whether the sound segment contains the wind noise based on a frequency feature; and comparing exhale phonemes in the phoneme sequence with sound segments determined as the wind noise in the sound segment sequence, comparing non-exhale phonemes in the phoneme sequence with wind noise segments, and determining that the sound signal contains the wind noise generated by the airflow hitting the microphone caused by the user speaking in a case that an overlap degree of the exhale phonemes and the wind noise segments is higher than a threshold and an overlap degree of the non-exhale phonemes and non-wind noise segments is lower than a threshold.

In an embodiment, whether the sound signal contains the voice of the user speaking and the wind noise generated by the airflow hitting the microphone caused by the user speaking is determined by: determining whether the sound signal contains a sound feature of the wind noise; in a case that the sound signal contains the wind noise, determining whether the sound signal contains a voice signal; in a case that the sound signal contains the voice signal, recognizing a phoneme sequence corresponding to the voice signal; calculating, for a wind noise feature in the sound signal, an intensity of the wind noise feature at each of time instants; obtaining, for each of phonemes in the phoneme sequence, a exhalation strength of the phoneme based on a pre-defined data model; and analyzing a consistency of the wind noise feature and the phoneme sequence based on a Gaussian mixture Bayesian model, and determining that the sound signal contains the wind noise generated by the airflow hitting the microphone caused by the user speaking in a case that an overlap degree is higher than a threshold.

2. Triggering Voice Input Based on Differences of Sound Signals Received by Multiple Microphones FIG. 2 shows a flow chart of a method for triggering voice input based on differences of sound signals received by multiple microphones of an electronic device arranged with the multiple microphones according to an embodiment of the present disclosure.

An electronic device, such as a mobile phone, is arranged with multiple microphones. The electronic device includes a memory and a central processor. The memory stores computer executable instructions. The computer executable instructions, when executed by the central processor, cause the central processor to the method for triggering voice input according to the embodiment.

Figure 2:
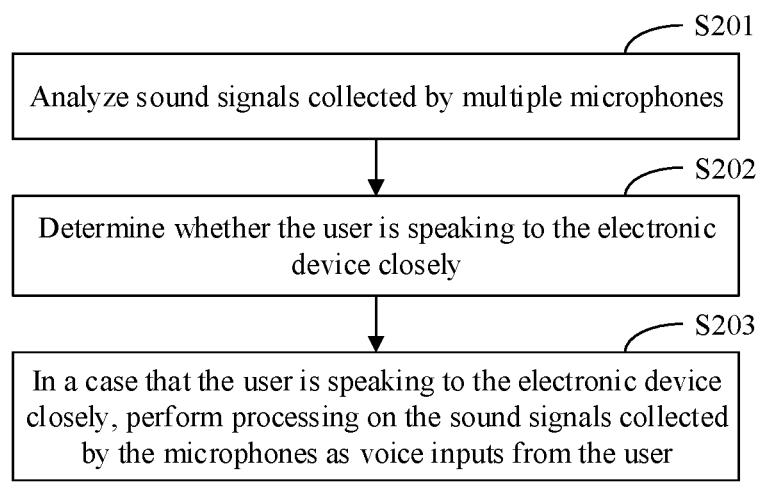
FIG. 2 shows a flow chart of a method for triggering voice input based on differences of sound signals received by multiple microphones of an electronic device arranged with the multiple microphones according to an embodiment of the present disclosure.

As shown in FIG. 2, in step S201, sound signals collected by the multiple microphones are analyzed.

In an embodiment, the multiple microphones include at least 3 microphones to form a microphone array system. A space position of a sound source relative to an intelligent device may be estimated based on differences of time instants when sound signal arrives at microphones.

Each of the above sound signals includes, for example, an amplitude of the sound signal and a frequency of the sound signal.

In step S202, it is determined whether the user is speaking to the electronic device closely based on the sound signals collected by the multiple microphones.

In an embodiment, whether the user is speaking to the electronic device closely is determined by: calculating a position of a mouth of the user relative to a microphone array based on differences of time instants when sound signals arrives at microphones in the microphone array; and determining that the user is speaking to the electronic device closely in a case that a distance between the mouth of the user and the electronic device is less than a threshold.

In an embodiment, the distance threshold is 10 cm.

In step S203, in a case that the user is speaking to the electronic device closely, processing is performed on the sound signals collected by the microphones as voice inputs from the user.

In an embodiment, the processing performed on the sound signals as voice inputs from the user includes: processing performed based on the distance between the mouth of the user and the electronic device in response to the voice inputs from the user. For example, in a case that the distance ranges from 0 cm to 3 cm, a voice assistant is activated in response to the voice inputs from the user; and in a case that the distance ranges from 3 cm to 10 cm, a WeChat application is activated in response to the voice inputs from the user to send a voice message to a friend.

In an embodiment, whether the user is speaking to the electronic device closely is determined by: determining whether a sound signal collected by at least one microphone contains a voice signal of the user speaking; in a case that the sound signal collected by the at least one microphone contains the voice signal of the user speaking, extracting the voice signal from the sound signal collected by the microphone; determining whether differences of amplitudes of voice signals extracted from the sound signals collected by the microphones exceed a predetermined threshold; and in a case that the differences of amplitudes exceed the predetermined threshold, determining that the user is speaking to the electronic device closely.

In the above embodiments, a microphone, by which a voice signal collected has a largest amplitude, in the multiple microphones may be determined as a response microphone, and processing is performed based on the determined response microphone in response to the voice inputs from the user. For example, in a case that the response microphone is arranged at a lower end of an intelligent phone, the voice assistant of the intelligent phone is activated; and in a case that the response microphone is arranged at an upper end of an intelligent phone, a voice recorder function is activated to record the voice of the user in a storage device.

In an embodiment, whether the user is speaking to the electronic device closely is determined by: based on a pre-trained machine learning model, processing the sound signals collected by the multiple microphones, and determining whether the user is speaking to the electronic device closely. Generally, training sample data is prepared, and then a selected machine learning model is trained using the training sample data. In practical applications (sometimes called testing), sound signals (as test samples) collected by multiple microphones are inputted to the machine learning model, and an output of the machine learning model indicates whether the user is speaking to the electronic device closely. In an embodiment, the machine learning model is, for example, a deep learning neural network, a support vector machine, and a decision tree.

In an embodiment, a voice of the user speaking includes: a voice of the user speaking at a normal volume, a voice of the user speaking at a low volume, and a voice of the user speaking without vibration of vocal cords.

In an embodiment, the processing performed on the sound signals as voice inputs from the user includes one or more of the following processing: storing the sound signals in a storage medium of the electronic device; transmitting the sound signals via an internet; converting voice signals in the sound signals to texts, and storing the texts in the storage medium of the electronic device; converting the voice signals in the sound signals to the texts, and transmitting the texts via the internet; and converting the voice signals in the sound signals to the texts, determining the voice signal as a voice command from the user, and performing processing in response to the voice command.

In an embodiment, a specific user is identified based on voiceprint analysis, and processing is only performed on a sound signal containing a voice of the specific user.

In an embodiment, the electronic device is an intelligent phone, an intelligent watch, an intelligent ring, a tablet computer, and the like.

According to the embodiments, whether the user is speaking to the electronic device closely is determined based on the differences of the sound signals obtained by different built-in microphones, and then it is determined whether to trigger voice input, achieving the advantages of reliable recognition and simple calculation.

3. Triggering Voice Input Based on Recognition of a Speaking at a Low Volume

Speaking at a low volume refers to the speaking (such as talking with others normally) at a volume less than a normal volume. The speaking at a low volume includes two cases. In one case, speaking is performed at a low volume without vibration of vocal cords (commonly known as whispering). In the other case, speaking is performed at a low volume with vibration of vocal cords. In the case of speaking at a low volume without vibration of vocal cords, a generated sound includes a sound by the air passing through throat and mouth and sound by the tongue and teeth in the mouth. In the case of speaking at a low volume with vibration of vocal cords, a generated sound includes the sound generated in the case of speaking at a low volume without vibration of vocal cords and a sound generated by the vibration of vocal cords. Compared with the speaking at a normal volume, in the speaking at a low volume with vibration of vocal cords, the degree of the vibration of vocal cords is small, thus the volume of the sound generated by the vibration is small. The frequency range of the sound generated by the user speaking at a low volume without vibration of vocal cords and the frequency range of the sound generated by the user speaking at a low volume with vibration of vocal cords are different, and may be distinguished. The speaking at a low volume with vibration of vocal cords and the speaking at a normal volume with vibration of vocal cords may be distinguished based on a volume threshold. The threshold may be set in advance or set by the user.

For example, the voice signal collected by the microphone is filtered to obtain two sound components including a sound component V1 generated by the vibration of the vocal cords and a sound component V2 generated by the air passing through throat and mouth and by the tongue and teeth in the mouth. In a case that a ratio of the energies of V1 and V2 is less than a threshold, it is determined that the user is speaking at a low volume.

Generally, the voice of the user speaking at a low volume can only be detected in a case that the user is close to the microphone, such as in a case that the distance between the user and the microphone is less than 30 cm. The interaction, by determining the speaking at a low volume in a short distance situation as voice input, is easy for the user to learn, understand and operate. Explicit awakening operations, such as pressing an awakening button or inputting a voice awakening word, are eliminated. In addition, the interaction is not be triggered by mistake in most practical situations.

Figure 3:
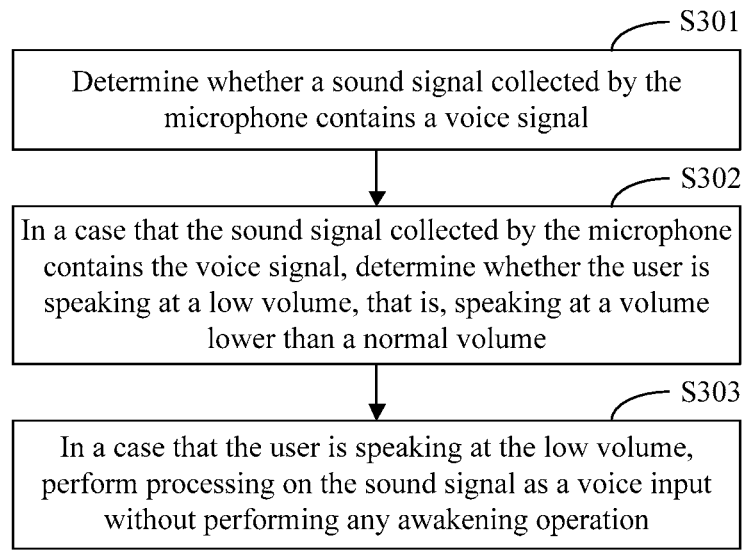
FIG. 3 shows a flow chart of a method for triggering voice input based on recognition of a speaking at a low volume by an electronic device with a built-in microphone according to an embodiment of the present disclosure.

FIG. 3 shows a flow chart of a method for triggering voice input based on recognition of a speaking at a low volume by an electronic device with a built-in microphone according to an embodiment of the present disclosure. The electronic device arranged with a microphone includes a memory and a central processor. The memory stores computer executable instructions. The computer executable instructions, when executed by the central processor, may cause the central processor to the method for triggering voice input according to the embodiments of the present disclosure.

As shown in FIG. 3, in step S301, it is determined whether a sound signal collected by the microphone contains a voice signal.

In step S302, in a case that the sound signal collected by the microphone contains the voice signal, it is determined whether the user is speaking at a low volume, that is, at a volume lower than a normal volume.

In step S303, in a case that the user is speaking at the low volume, processing is performed on the sound signal as a voice input without performing any awakening operation.

The speaking at a low volume includes speaking at a low volume with vibration of vocal cords and speaking at a low volume without vibration of vocal cords.

In an embodiment, the method for triggering voice input further includes: in a case that the user is speaking at the low volume, determining whether the user is speaking at the low volume with vibration of vocal cords or at the low volume without vibration of vocal cords; and performing processing on the sound signal based on a determination result.

In an embodiment, the processing includes performing processing on the voice input by different applications. For example, a voice assistant of a mobile phone is controlled in a case that the user is speaking at a normal volume, WeChat is controlled in a case that the user is speaking at a low volume, and voice transcription notes is made in a case that the user is speaking without vibration of vocal cords.

In an embodiment, signal features based on which whether the user is speaking in the low volume is determined include a volume, a spectral feature, and an energy distribution.

In an embodiment, signal features based on which whether the user is speaking at the low volume with vibration of vocal cords or at the low volume without vibration of vocal cords is determined include the volume, the spectral feature, the energy distribution, and the like.

In an embodiment, whether the user is speaking at the low volume may be determined by: based on a machine learning model, performing processing on the sound signal collected by the microphone and determining whether the user is speaking at the low volume.

In an embodiment, the machine learning model may be a convolutional neural network model or a recurrent neural network model.

In an embodiment, whether the user is speaking at the low volume with vibration of vocal cords or at the low volume without vibration of vocal cords is determined by: based on a machine learning model, performing processing on the sound signal collected by the microphone, and determining whether the user is speaking at the low volume with vibration of vocal cords or at the low volume without vibration of vocal cords.

In an embodiment, the processing performed on the sound signal as a voice input from the user includes one or more of the following processing: storing the sound signal in a storage medium of the electronic device; transmitting the sound signal via an internet; converting a voice signal in the sound signal to a text, and storing the text in the storage medium of the electronic device; converting the voice signal in the sound signal to the text, and transmitting the text via the internet; and converting the voice signal in the sound signal to the text, determining the voice signal as a voice command from the user, and performing processing in response to the voice command.

In an embodiment, the method for triggering voice input may further include: identifying a specific user based on voiceprint analysis, and performing processing on a sound signal containing a voice of the specific user.

In an embodiment, the electronic device may be an intelligent phone, an intelligent watch, an intelligent ring, and the like.

For the speaking in a low volume and detection methods, as an example, one may refer to the following references:

Zhang, chi, and John HL Hansen. "Analysis and classification of speech mode: whispered through shouted". Eighth Annual Conference of the International Speech Communication Association. 2007; and Meenakshi, G. Nisha, and Prasanta Kumar Ghosh. "Robust whisper activity detection using long-term log energy variation of sub-band signal". IEEE Signal Processing Letters 22.11 (2015): 1859-1863.

4. Triggering Voice Input Based on Determination of a Distance of a Sound Signal Received by a Microphone Hereinafter, shows a flow chart of a method for triggering voice input based on determination of a distance of a sound signal obtained by a microphone is described in conjunction with FIG. 4.

Figure 4:
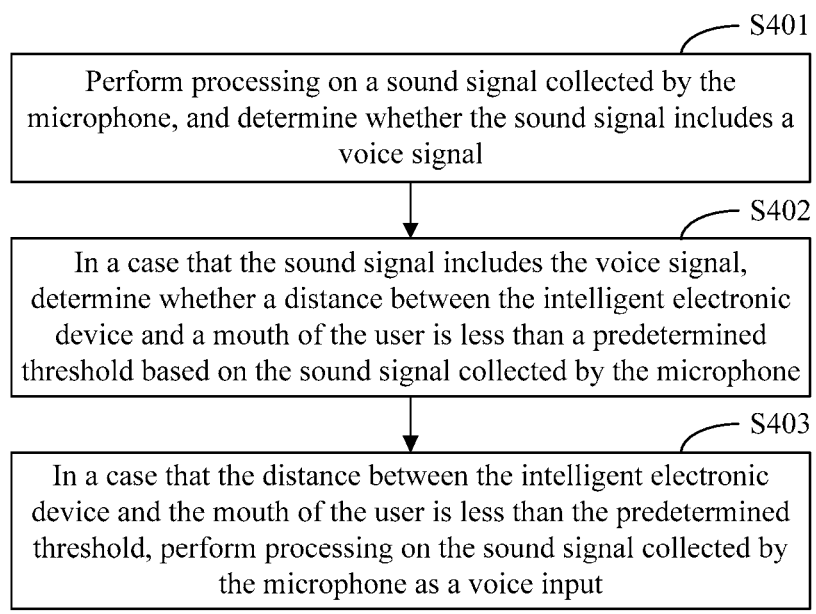
FIG. 4 shows a flow chart of a method for triggering voice input based on determination of a distance of a sound signal obtained by a microphone.

As shown in FIG. 4, in step 401, processing is performed on a sound signal collected by the microphone, and it is determined whether the sound signal includes a voice signal.

In step 402, in a case that the sound signal includes the voice signal, it is determined whether a distance between the intelligent electronic device and a mouth of the user is less than a predetermined threshold based on the sound signal collected by the microphone.

In step 403, in a case that the distance between the intelligent electronic device and the mouth of the user is less than the predetermined threshold, processing is performed on the sound signal collected by the microphone as a voice input.

In an embodiment, the predetermined threshold is 3 cm.

In an embodiment, the voice signal includes one or a combination of: a voice of the user speaking at a normal volume, a voice of the user speaking at a low volume, and a voice of the user speaking without vibration of vocal cords.

In an embodiment, features based on which whether the distance between the intelligent electronic device and the mouth of the user is less than the predetermined threshold is determined include a time-domain feature, a frequency-domain feature, the volume, and a spectral energy.

In an embodiment, whether the distance between the intelligent electronic device and the mouth of the user is less than the predetermined threshold is determined by: performing processing one data collected by the microphone by using a deep neural network model, and determining whether the distance between the intelligent electronic device and the mouth of the user is less than the predetermined threshold.

In an embodiment, whether the distance between the intelligent electronic device and the mouth of the user is less than the predetermined threshold is determined by: recording a voice signal from the user in a case that the user does not make a voice input; comparing a current voice signal collected by the microphone with the voice signal in the case that the user does not make the voice input; and in a case that a volume of the current voice signal collected by the microphone exceeds a volume of the voice signal in the case that the user does not make the voice input by a threshold, determining that the distance between the intelligent electronic device and the mouth of the user is less than the predetermined threshold.

In an embodiment, the processing performed on the sound signal as a voice input from the user includes one or more of the following processing: storing the sound signal in a storage medium of the electronic device; transmitting the sound signal via an internet; converting a voice signal in the sound signal to a text, and storing the text in the storage medium of the electronic device; converting the voice signal in the sound signal to the text, and transmitting the text via the internet; and converting the voice signal in the sound signal to the text, determining the voice signal as a voice command from the user, and performing processing in response to the voice command.

In an embodiment, the method for triggering voice input further includes: identifying a specific user based on voiceprint analysis, and performing processing on a sound signal containing a voice of the specific user.

In an embodiment, the electronic device is an intelligent phone, an intelligent watch, an intelligent ring, and the like.

Figure 5:
FIG. 5 shows a front view of a trigger action of putting a microphone arranged on an upper end of a mobile phone at a position close to a mouth according to an embodiment of the present disclosure.
Figure 6:
FIG. 6 shows a side view of a trigger action of putting a microphone arranged on an upper end of a mobile phone at a position close to a mouth according to an embodiment of the present disclosure.
Figure 7:
FIG. 7 shows a front view of a trigger action of putting a microphone arranged on a lower end of a mobile phone at a position close to a mouth according to an embodiment of the present disclosure.
Figure 8:
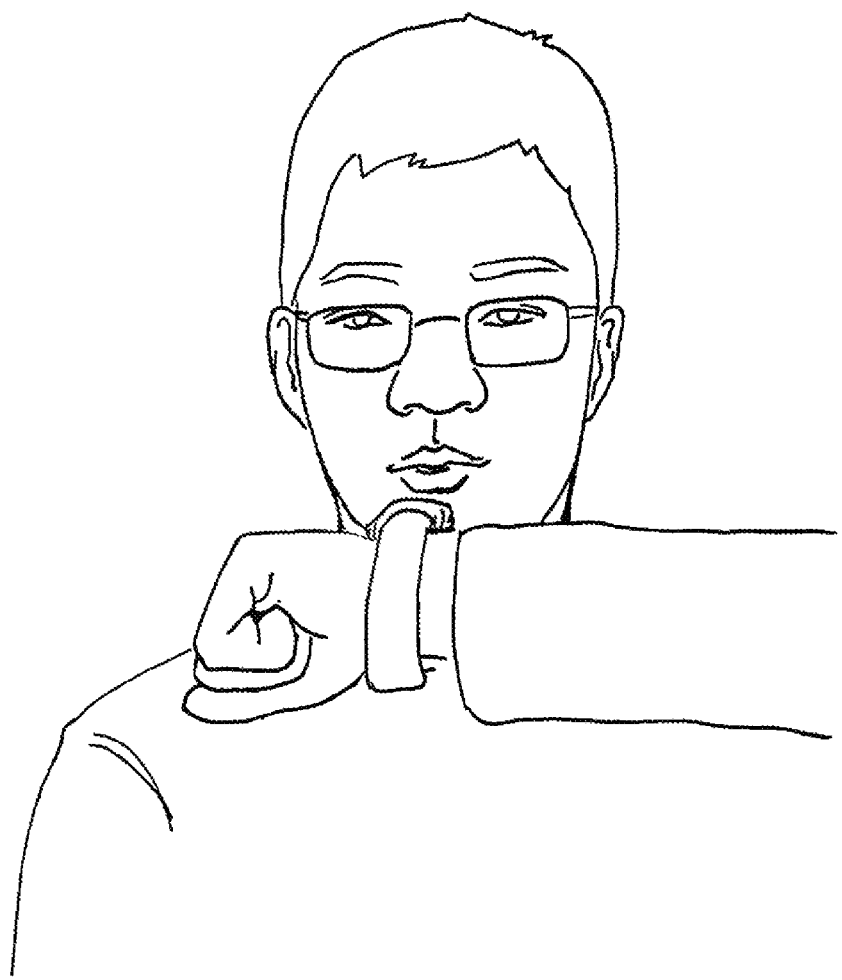
FIG. 8 shows a schematic diagram of a trigger action of putting a microphone of an intelligent watch at a position close to a mouth according to an embodiment of the present disclosure.

FIGS. 5 to 8 show a few cases in which the user puts a microphone of an intelligent electronic portable device at a position close to the mouth. In these cases, the voice of the user speaking is determined as voice input. FIGS. 5 and 6 shows cases in which a microphone is arranged at an upper end of the mobile phone. In the cases, if the user has the intention to perform voice interaction, the user may move the microphone of the mobile phone to a position of 0 to 10 cm from the mouth of the user, and speak directly. The voice of the user speaking may be determined as voice input. FIG. 7 shows a case in which a microphone is arranged at a lower end of the mobile phone. Similar to the case in which the microphone is arranged at the upper end of the mobile phone, the actions in the two cases are not mutually exclusive. In a case that microphones are arranged at the upper end and the lower end of the mobile phone, interaction may be performed in any action. FIG. 8 shows a case in which the device is an intelligent watch, similar to the above cases in which the device is a mobile phone. The description of the triggering actions is exemplary and not exhaustive, and is not limited by the disclosed devices and microphones.

In an embodiment, a single microphone is used to receive a sound input and trigger a voice input. It is determined whether the sound input is voice by analyzing the sound input received by the microphone. It is determined whether the distance between the electronic device and the mouth of the user is less than a predetermined threshold by analyzing an unique feature, such as a microphone popping sound, a near-field wind noise, a blowing sound, an energy, a spectral feature and a time-domain feature, of a voice within a close range. It is determined whether the voice input is from a serviceable user based on voiceprint recognition. Based on the above determination, it is determined whether to use the signal obtained by the microphone as a voice input.

In an embodiment, dual microphone is used to receive a sound input and trigger a voice input. It is determined whether the position of the sound source is close to one of the microphones by analyzing differences of features, such as energy features and frequency spectrum features, of the input signals from the dual microphones. Based on difference of the signals from the dual microphones, environmental noise is shielded and voice is separated to a corresponding mono channel. Based on the feature analysis method applied in the single microphone, it is determined whether the distance between the electronic device and the mouth of the user is less than a predetermined threshold. In addition, it is determined whether the voice input is from a serviceable user based on voiceprint recognition. Based on the above determination, it is determined whether to use the signals as a voice input.

In an embodiment, a multi-microphone array is used to receive a sound input and trigger a voice input. Differences of sound input signals received by different microphones are compared and analyzed, a near-field voice signal is separated from the environment, and whether the sound signal is identified and detected to determine whether the sound signal includes a voice. It is determined whether the distance between the position of the mouth of the user inputting the voice signal and the device is less than a predetermined threshold by using a sound source localization technology based on the multi-microphone array. In addition, it is determined whether the voice input is from a serviceable user based on voiceprint recognition. Based on the above analysis, it is determined whether to use the signal as a voice input.

In an embodiment, the intelligent electronic portable device analyzes a voice signal and detects that the sound source is nearby, that is, the mobile device is at a position close to the mouth of the user. The intelligent electronic portable device determines the sound signal as a voice input. According to the task and context, the intelligent electronic portable device understands the voice input of the user by using natural language processing technology and performs corresponding tasks.

The microphone is not limited to the foregoing embodiments, and may include one or a combination of: a built-in single microphone in the device, built-in dual microphones in the device, a built-in multi-microphone array in the device, an external wireless microphone, and an external wired microphone.

As mentioned above, the intelligent electronic portable device may be a mobile phone, a wired headset arranged with a binaural Bluetooth earphone and a microphone, or other microphone sensors.

The intelligent electronic portable device may be a watch, or an intelligent wearable device such as an intelligent rings and an intelligent watch.

The intelligent electronic portable device is a head-mounted intelligent display device arranged with a microphone or a multi-microphone group.

In an embodiment, after activating a voice input application, the electronic device may provide a feedback output. The feedback output includes one or a combination of vibration, voice, and image.

With the solutions of the embodiments of the present disclosure, one or more of the following advantages can be achieved.

1. Natural interaction. Voice input is triggered by putting the device in front of the mouth, conforming to the habits and cognition of the user.
2. High efficiency. Operation can be performed with one hand. It is unnecessary to switch between different user interfaces/applications or press a button, and it is only required to lift a hand to put the device next to the mouth.
3. High radio quality. Since a recorder of the device is next to the mouth of the user, the voice input signal received is clear, less affecting by environmental sounds.
4. High privacy and sociality. A high-quality voice input is provided by the user speaking at a low volume due to that the device is in front of the mouth, causing little interference to others. In addition, the user may make actions such as covering the mouth, achieving a good privacy protection.

The embodiments of the present disclosure are described hereinbefore. The above description is illustrative rather than restrictive, and is not limited to the above embodiments. Without departing from the scope and spirit of the embodiments of the present disclosure, various variations and modifications are apparent to those skilled in the art. Therefore, the protection scope of the present disclosure should be subject to the protection scope of the claims.

The invention claimed is:

1. An electronic device arranged with a microphone, wherein the electronic device comprises a memory and a central processor, the memory stores computer executable instructions, and the computer executable instructions, when executed by the central processor, cause the central processor to:

analyze a sound signal collected by the microphone, and determine whether the sound signal contains a voice of a user speaking and a wind noise generated by an airflow hitting the microphone caused by the user speaking; and in a case that the sound signal contains the voice of the user speaking and the wind noise generated by the airflow hitting the microphone caused by the user speaking, perform processing on the sound signal as a voice input from the user;

wherein whether the sound signal contains the voice of the user speaking and the wind noise generated by the airflow hitting the microphone caused by the user speaking is determined by:

determining whether the sound signal contains the voice of the user; in a case that the sound signal contains the voice of the user, recognizing phonemes in the voice and converting a voice signal to a phoneme sequence; determining, for each of phonemes in the phoneme sequence, whether the phoneme is an exhale phoneme, wherein an airflow comes out of a mouth of the user when the user utters the phoneme; dividing the sound signal into exhale phoneme segments using a window having a constant length, wherein the sound segments form a sound segment sequence; and determining, for each of the sound segments, whether the sound segment contains the wind noise based on a frequency feature; or determining whether the sound signal contains a sound feature of the wind noise; in a case that the sound signal contains the wind noise, determining whether the sound signal contains a voice signal; in a case that the sound signal contains the voice signal, recognizing a phoneme sequence corresponding to the voice signal; calculating, for a wind noise feature in the sound signal, an intensity of the wind noise feature at each of time instants; and obtaining, for each of phonemes in the phoneme sequence, a exhalation strength of the phoneme based on a predefined data model.

2. The electronic device according to claim 1, wherein the voice of the user speaking comprises:

a voice of the user speaking at a normal volume, a voice of the user speaking at a low volume, and a voice of the user speaking without vibration of vocal cords.

3. The electronic device according to claim 1, wherein the processing performed on the sound signal as a voice input from the user comprises one or more of:

storing the sound signal in a storage medium of the electronic device;

transmitting the sound signal via an internet;

converting a voice signal in the sound signal to a text, and storing the text in the storage medium of the electronic device;

converting the voice signal in the sound signal to the text, and transmitting the text via the internet; and converting the voice signal in the sound signal to the text, determining the voice signal as a voice command from the user, and performing processing in response to the voice command.

4. The electronic device according to claim 1, wherein the central processor is further configured to:

identify a specific user based on voiceprint analysis, and perform processing on a sound signal containing a voice of the specific user.

5. The electronic device according to claim 1, wherein the electronic device is one of an intelligent phone, an intelligent watch, and an intelligent ring.

6. The electronic device according to claim 1, wherein the central processor is further configured to:

determine, by using a neural network model, whether the sound signal contains the voice of the user speaking and the wind noise generated by the airflow hitting the microphone caused by the user speaking.

7. The electronic device according to claim 1, wherein whether the sound signal contains the voice of the user speaking and the wind noise generated by the airflow hitting the microphone caused by the user speaking is determined by:

comparing exhale phonemes in the phoneme sequence with sound segments determined as the wind noise in the sound segment sequence, comparing non-exhale phonemes in the phoneme sequence with wind noise segments, and determining that the sound signal contains the wind noise generated by the airflow hitting the microphone caused by the user speaking in a case that an overlap degree of the exhale phonemes and the wind noise segments is higher than a threshold and an overlap degree of the non-exhale phonemes and non-wind noise segments is lower than a threshold.

8. The electronic device according to claim 1, wherein whether the sound signal contains the voice of the user speaking and the wind noise generated by the airflow hitting the microphone caused by the user speaking is determined by:
analyzing a consistency of the wind noise feature and the phoneme sequence based on a Gaussian mixture Bayesian model, and determining that the sound signal contains the wind noise generated by the airflow hitting the microphone caused by the user speaking in a case that an overlap degree is higher than a threshold.

9. The electronic device according to claim 1, wherein the central processor is further configured to:
in a case that the user is speaking to the electronic device closely,
determine the voice of the user speaking is a voice of the user speaking at a normal volume, a voice of the user speaking at a low volume, or a voice of the user speaking without vibration of vocal cords; and
perform processing on the sound signal based on a determination result.

10. The electronic device according to claim 9, wherein the processing is performed by activating different applications to perform processing on the voice input.

11. The electronic device according to claim 9, wherein features for determination comprise a volume, a spectral feature, and an energy distribution.

12. A method for awakening voice interaction, performed by an electronic device arranged with a microphone, wherein the electronic device comprises a memory and a central processor, the memory stores computer executable instructions, the computer executable instructions, when executed by the central processor, cause the central processor to perform the method for awakening voice interaction, and the method for awakening voice interaction comprises:
analyzing a sound signal collected by the microphone, and determining whether the sound signal contains a voice of a user speaking and a wind noise generated by an airflow hitting the microphone caused by the user speaking; and
in a case that the sound signal contains the voice of the user speaking and the wind noise generated by the airflow hitting the microphone caused by the user speaking, performing processing on the sound signal as a voice input from the user;
wherein the determining whether the sound signal contains a voice of a user speaking and a wind noise generated by an airflow hitting the microphone caused by the user speaking comprises:
determining whether the sound signal contains the voice of the user; in a case that the sound signal contains the voice of the user, recognizing phonemes in the voice and converting a voice signal to a phoneme sequence; determining, for each of phonemes in the phoneme sequence, whether the phoneme is an exhale phoneme, wherein an airflow comes out of a mouth of the user when the user utters the phoneme; dividing the sound signal into exhale phoneme segments using a window having a constant length, wherein the sound segments form a sound segment sequence; and determining, for each of the sound segments, whether the sound segment contains the wind noise based on a frequency feature; or
determining whether the sound signal contains a sound feature of the wind noise; in a case that the sound signal contains the wind noise, determining whether the sound signal contains a voice signal; in a case that the sound signal contains the voice signal, recognizing a phoneme sequence corresponding to the voice signal; calculating, for a wind noise feature in the sound signal, an intensity of the wind noise feature at each of time instants; and obtaining, for each of phonemes in the phoneme sequence, a exhalation strength of the phoneme based on a pre-defined data model.

13. A non-transitory computer readable medium storing computer executable instructions, wherein the computer executable instructions, when executed by a computer, cause the computer to perform a method for awakening voice interaction, and the method for awakening voice interaction comprises:
analyzing a sound signal collected by the microphone, and determining whether the sound signal contains a voice of a user speaking and a wind noise generated by an airflow hitting the microphone caused by the user speaking; and
in a case that the sound signal contains the voice of the user speaking and the wind noise generated by the airflow hitting the microphone caused by the user speaking, performing processing on the sound signal as a voice input from the user;
wherein the determining whether the sound signal contains a voice of a user speaking and a wind noise generated by an airflow hitting the microphone caused by the user speaking comprises:
determining whether the sound signal contains the voice of the user; in a case that the sound signal contains the voice of the user, recognizing phonemes in the voice and converting a voice signal to a phoneme sequence; determining, for each of phonemes in the phoneme sequence, whether the phoneme is an exhale phoneme, wherein an airflow comes out of a mouth of the user when the user utters the phoneme; dividing the sound signal into exhale phoneme segments using a window having a constant length, wherein the sound segments form a sound segment sequence; and determining, for each of the sound segments, whether the sound segment contains the wind noise based on a frequency feature; or
determining whether the sound signal contains a sound feature of the wind noise; in a case that the sound signal contains the wind noise, determining whether the sound signal contains a voice signal; in a case that the sound signal contains the voice signal, recognizing a phoneme sequence corresponding to the voice signal; calculating, for a wind noise feature in the sound signal, an intensity of the wind noise feature at each of time instants; and obtaining, for each of phonemes in the phoneme sequence, a exhalation strength of the phoneme based on a pre-defined data model.

* * * * *